No. 672,610. Patented Apr. 23, 1901.
C. O. BARNES.
BACK PEDALING BRAKE.
(Application filed Nov. 1, 1900.)
(No Model.)
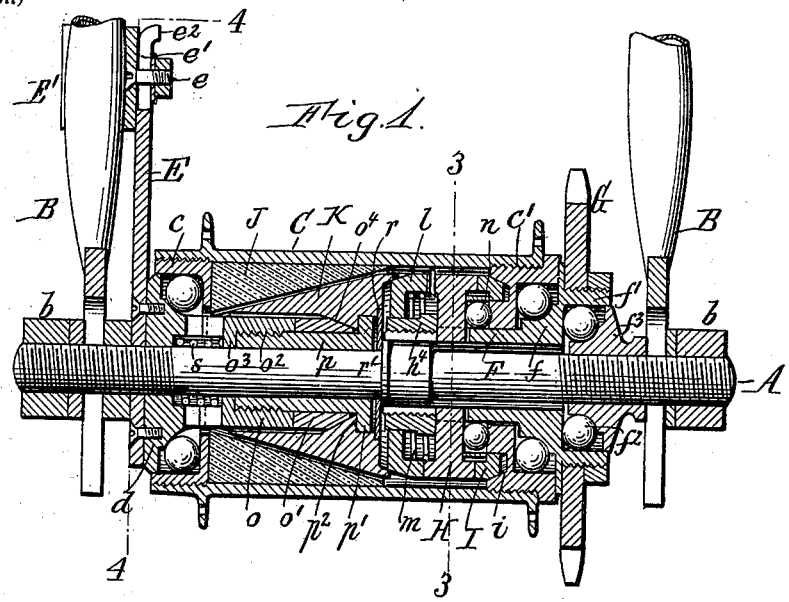
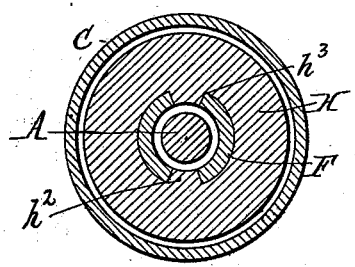
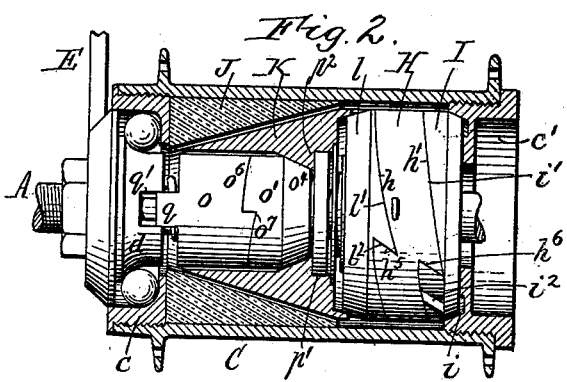
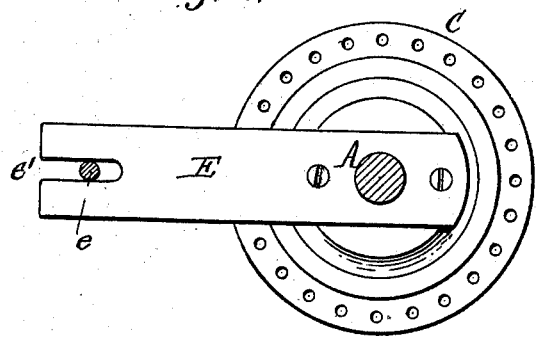
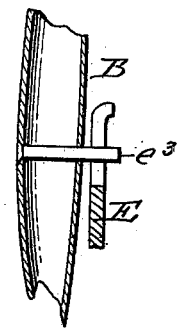
Witnesses:
E. A. Volk.
F. F. Scherzinger.
Charles O. Barnes, Inventor.
By Wilhelm & Bonner, Attorneys.
THE NORRIS PETERS CO., PHOTO-LITHO., WASHINGTON, D. C.

UNITED STATES PATENT OFFICE.

CHARLES O. BARNES, OF BUFFALO, NEW YORK, ASSIGNOR OF TWO-THIRDS TO JESSE B. ECCLESTON AND HARRISON M. ANGLE, OF SAME PLACE.

BACK-PEDALING BRAKE.

SPECIFICATION forming part of Letters Patent No. 672,610, dated April 23, 1901.

Application filed November 1, 1900. Serial No. 35,111. (No model.)

*To all whom it may concern:*

Be it known that I, CHARLES O. BARNES, a citizen of the United States, residing at Buffalo, in the county of Erie and State of New York, have invented new and useful Improvements in Back-Pedaling Brakes, of which the following is a specification.

This invention relates more particularly to back-pedaling coaster-brakes.

One of the objects of my invention is to provide a simple and powerful brake of this kind which is prompt in action and which exerts no end thrust upon the bearings.

Another object is to so construct the brake that it permits the machine to be backed or the rear wheel to be turned from the cranks or otherwise like the rear wheel of an ordinary bicycle unequipped with a back-pedaling brake.

In the accompanying drawings, Figure 1 is a longitudinal central section of a wheel-hub provided with my improved brake, showing the parts in position for propelling the machine. Fig. 2 is a similar view thereof, showing the various cam members in elevation. Fig. 3 is a cross-section in line 3 3, Fig. 1. Fig. 4 is a vertical section in line 4 4, Fig. 1. Fig. 5 is a fragmentary horizontal section of the brake arm or bracket and the adjacent frame member, showing a slight modification.

Like letters of reference refer to like parts in the several figures.

A is the rear axle, which is clamped in the fork ends B of the bicycle or other velocipede by the usual nuts $b$.

C is the wheel-hub, which is journaled on the axle by ball-bearings of any suitable construction. In the preferred construction shown in the drawings the hub is provided at its ends with outwardly-facing ball-cups $c$ $c'$.

$d$ is an annularly-grooved collar, which forms the left-hand bearing-cone and which is formed on or secured to the inner end of a horizontal arm or bracket E. This arm is provided at its outer end with a clip E', which embraces the adjacent member of the bicycle-frame, as shown in Fig. 1. In the construction shown in Fig. 1 of the drawings this clip is provided with an inwardly-extending screw-bolt $e$, which passes through a longitudinal slot $e'$, formed in the arm E and extending to the front end thereof. The nut of this bolt is arranged on the inner side of the arm E, and the front end of the latter is bent inwardly to form a lip or stop $e^2$, which prevents the clip from becoming disengaged from the arm in case the nut of the bolt should become loose. The slot $e'$ permits of the usual adjustment of the rear wheel of the fork.

If desired, a pin $e^3$, brazed in an opening of the fork side, may be substituted for the clip E' and bolt $e$, as shown in Fig. 5.

$f$ is the companion cone of the left-hand bearing-cup $c'$, which cone is formed on or secured to a rotary sleeve F. This sleeve surrounds the axle, and its outer portion is enlarged and extends beyond the end of the hub and is provided in its outer end with an auxiliary ball-cup $f'$, containing a set of balls $f^2$. $f^3$ is the companion cone of this auxiliary bearing-cup, which is mounted on the axle A.

G is the sprocket or driving wheel, which is tightly secured to the projecting outer end of the rotary sleeve F, so that the latter is compelled to turn with said wheel in both directions.

H is a rotary cam-ring arranged within the wheel-hub and surrounding the rotary sleeve F and provided at its inner and outer edges with spiral or oblique cam-faces $h$ $h'$, which rise in opposite directions. This cam-ring is caused to turn with the sleeve F, preferably by radial lugs $h^2$, which project inwardly from the bore of the ring into longitudinal slots or recesses $h^3$, formed in opposite sides of said sleeve, as shown in Fig. 3. These slots extend to the inner end of the sleeve F, as shown in Fig. 1, and the cam-ring is retained upon the sleeve by a cylindrical screw-nut $h^4$, applied to the screw-threaded inner end of the sleeve.

I is a loose clutch-ring interposed between the cam-ring H and the right-hand bearing-cup $c'$ or an equivalent internal flange or clutch-face of the hub. This clutch-ring preferably extends into an annular socket $i$, formed in the inner side of the cup or flange $c'$, and the outer face of this ring and the socket $i$ are tapered toward the adjacent end of the hub, as shown in Fig. 1. The clutch-ring I is provided at its inner edge with a cam face or faces $i'$, which correspond to the contiguous cam-faces $h'$ of the cam-ring H, and these cam-faces trend in the proper direction to cause the clutch-ring to be wedged into the tapering socket $i$ when the cam-ring is turned forwardly with the sleeve F in propelling the machine, thereby compelling the hub to turn forward with the driving-wheel G. In applying the driving-clutch the cam-ring H is held against lateral or inward movement by its lugs $h^2$, which abut against the screw-nut $h^4$. It will be observed that the ring I forms the movable member of the driving-clutch and the back of the cup $c'$ the relatively stationary member of said clutch.

J is a friction surface or sleeve of vulcanized fiber or other suitable material, which is secured within the wheel-hub, so as to turn therewith and which is preferably provided with a conical bore. This friction-sleeve abuts at its inner end against the left-hand ball-cup $c$ or an equivalent internal stop of the wheel-hub.

K is a brake or shoe member, preferably of conical form, which is capable of sliding lengthwise into and out of contact with the inner surface of the friction-sleeve J, but is held against forward rotation on its support, so as to retard or arrest the forward rotation of the wheel-hub when the brake is applied.

$l$ is an auxiliary cam-ring which loosely surrounds the screw-nut $h^4$ and which is interposed between the main cam-ring H and the head or large end of the brake-cone. This auxiliary cam-ring bears at its inner end against the brake-cone, and said end is preferably conical and fits into a corresponding socket formed in the large end of the brake-cone. This cam-ring is provided at its outer edge with spiral or oblique cam-faces $l'$, which bear against the adjacent cam-faces $h$ of the main cam-ring H. These contiguous cam-faces rise in the opposite direction to the clutch-applying cams $i'$, so that when the main cam-ring H is turned rearwardly by back-pedaling said cam-faces cause the auxiliary cam-ring $l$ to be shifted laterally toward the conical friction-sleeve J, thereby forcing the brake-cone into said sleeve. As the auxiliary cam-ring is loose, it is necessary to provide some means for preventing the same from turning backward with the main cam-ring H in applying the brake; otherwise said ring will not be shifted laterally. In the construction shown in the drawings this is accomplished by a spring $m$, which surrounds the screw-nut $h^4$ and bears at its ends against the auxiliary cam-ring and the main cam-ring, respectively, as shown in Fig. 1. This spring tends to press the auxiliary cam-ring against the brake-cone, which latter resists backward rotation of the auxiliary cam-ring, thereby causing this ring to be shifted laterally by the main cam-ring upon back-pedaling.

In order to hold the auxiliary cam-ring out of contact with the brake-cone and prevent friction between these parts in propelling the machine, the shoulders $h^5$ and $l^2$ at the rear ends of the contiguous cam-faces of the main and auxiliary cam-rings are undercut or arranged obliquely to the axis of these rings, as shown in Fig. 2. By this construction these oblique shoulders by their cam action withdraw the auxiliary cam-ring clear of the brake-cone when the main cam-ring is turned forwardly in driving the machine, and upon back-pedaling to apply the brake the shoulders $h^5$ of the main cam-ring recede rearwardly from those of the auxiliary ring and allow the spring $m$ to press the latter into contact with the brake-cone for frictionally holding the auxiliary ring against backward movement with the main ring.

To withdraw the clutch-ring I out of contact with its socket $i$ in back-pedaling, the shoulders $i^2$ of this ring and the corresponding shoulders $h^6$ of the main cam-ring H are made oblique, similar to the corresponding shoulders of the main and auxiliary cam-rings, as shown.

$n$ represents antifriction-balls arranged in an annular row around the rotary sleeve F and interposed between the outer side of the main cam-ring H and the adjacent inner side of the inner right-hand bearing-cup $c'$. These balls abut against the cup $c'$ and in turn form the abutment for the main cam-ring H when the brake is applied, thereby relieving the clutch-ring I from the thrust of said main cam-ring and preventing the sprocket-wheel from being clutched to the wheel-hub and rotating the cranks through the driving-chain, which would be liable to occur in the absence of said balls.

If desired, the brake-cone may be rigidly secured to a non-rotary support in any suitable or customary manner; but the same is preferably connected with its support by a clutch or connection, which prevents the brake-cone from turning forwardly, but allows the same to turn backwardly with the wheel-hub to permit the machine to be backed. For this purpose I prefer to employ the clutch shown in the drawings, which consists of two cams or clutch-collars $o$ $o'$ and a sleeve $p$, upon which said collars are mounted and which loosely surrounds the axle A. These clutch-collars and the sleeve $p$ are arranged within the hollow brake-cone K, and the sleeve is provided at its inner end with a projecting annular flange $p'$, which is seated in a corresponding socket formed in the large end of the brake-cone and which bears against the shoulder $p^2$, formed by the bottom of said socket. The outer clutch-collar $o$ is connected with the outer portion of the sleeve $p$ by a right-hand screw-thread $o^2$ and is provided at its outer end with a head $o^3$, adapted to abut against the adjacent end of the sleeve and having an opening for the passage of the axle. The inner clutch-collar $o'$ is provided with a tapering or conical front end $o^4$, which bears against a conical face or seat formed in the bore of the brake-cone adjacent to its shoulder $p^2$. The contiguous inner ends of the two clutch-collars are formed with oblique or cam faces $o^6$, which are provided at their rear ends with abrupt faces or shoulders $o^7$. The inner clutch-collar is free to turn to a limited extent; but the outer clutch-collar is held against turning in both directions by a tenon $q$, arranged at the outer end of said ring and engaging in a recess $q'$, formed in the stationary bearing-cone $d$. This connection, while holding the outer clutch-collar against turning, permits this collar, the inner clutch-collar, the sleeve $p$, and the brake-cone to slide lengthwise in the hub.

The brake-cone is provided at its large end with an axial washer or head $r$, which closes the adjacent end of its bore and abuts against a shoulder or stop-collar $r'$, secured to the axle, so as to limit the withdrawing movement of the brake-cone.

$s$ is a spring interposed between the bearing-cone $d$ and the head of the outer clutch-ring $o$ and tending to press the conical end of the inner clutch-ring $o'$ against the internal conical face of the brake-cone and the washer $r$ of the brake-cone against the stop-collar $r'$. In order to cause the inner clutch-ring to bear firmly against the internal conical face of the brake-cone for resisting the rotation of the latter, the necessary clearance is left between the flanged end of the sleeve $p$ and the washer $r$, as shown in Figs. 1 and 2.

In the normal retracted position of the brake-cone the same is not tightly connected with its support; but its rotary movement is frictionally resisted by the pressure of its washer $r$ against the stop-collar $r'$ and the pressure of the inner clutch-collar $o'$ against the internal conical face of the brake-cone, which pressure is exerted by the compressed spring $s$. This pressure is sufficient to cause the brake-cone to prevent backward rotation of the auxiliary cam-ring $l$ when the main cam-ring H is reversed in back-pedaling. When the brake-cone is wedged into the friction-sleeve J in applying the brake, the brake-cone is first turned forwardly with said sleeve and the wheel-hub. As the inner clutch-collar $o'$ is held in frictional contact with the brake-cone by the spring $s$, said collar is caused to turn forwardly with the brake-cone, thereby causing its cam-faces to ride upon the cam-faces of the non-rotary clutch-collar $o$ and tightly forcing the conical end of the inner clutch-collar against the internal conical face of the brake-cone and the internal shoulder $p^2$ of the brake-cone against the flange $p'$ of the sleeve. It will be observed that the flange of this sleeve limits the lateral movement of the brake-cone toward the right and that the outer clutch-collar $o$, which is screwed upon said sleeve, forms a relatively-fixed abutment for the inner clutch-collar, so that when the latter collar is turned forwardly, as above described, it necessarily clamps the shoulder of the brake-cone laterally against the flange of said sleeve, and owing to the conical form of the inner clutch-collar and the corresponding internal face of the brake-cone the latter is clamped to its support both in a radial and a lateral direction. The forward rotation of the brake-cone, which takes place when the same is first shifted into contact with the friction-sleeve J of the wheel-hub, is but slight and momentary and does not interfere with the prompt action of the brake.

In order to permit the main cam-ring H to move laterally for accommodating itself to the wear of the thrust-bearing $n$, the slots $h^3$ in the sleeve F, which receive the lugs $h^2$ of said ring, are made of sufficient length to permit the necessary lateral play of said ring, as shown in Fig. 1. By this construction said lugs remain at all times out of contact with the ends of said slots and do not therefore cause the sleeve F to crowd the balls of the extreme right-hand ball-bearing against the cone $f$.

The operation of my improved brake, briefly stated, is as follows: In propelling the machine the wheel-hub is caused to turn forwardly with the sprocket or driving wheel by the clutch-ring I, which latter is forced outwardly into the clutch-socket of the bearing-cup $c'$ by the forward rotation of the main cam-ring H. In thus driving the machine the wheel-hub turns upon the left-hand ball-bearing and the outer or extreme right-hand bearing. In coasting the cranks are slightly turned backward and then held stationary in the customary manner. By this slight backward movement the outer cam-faces of the main cam-ring H recede from the clutch-ring and the latter turns forward with the hub until the abrupt shoulders of its cam-faces strike the corresponding shoulders of the main cam-ring, when the clutch-ring is released from the hub and held stationary and the hub continues its forward rotation independently of the clutch-ring. In coasting the wheel-hub turns upon its left-hand ball-bearing and the inner right-hand bearing. Upon back-pedaling to apply the brake the main cam-ring H is turned backward with the sprocket-wheel. The inner cam-faces of said ring acting against the cam-faces of the auxiliary cam-ring $l$ shift the latter toward the brake end of the hub and cause the same to force the brake-cone into the conical friction-sleeve J, thereby retarding or arresting the movement of the wheel-hub. During this action the auxiliary cam-ring $l$ is prevented from turning backward with the main cam-ring H by its frictional contact with the brake-cone, as hereinbefore described. Upon again pedaling forward to release the brake the main cam-ring is also turned forwardly and its inner cam-faces ride down those of the auxiliary cam-ring and allow the brake-cone to become disengaged from the friction-sleeve J. Upon backing the machine, for instance, out of a rack or raising the rear wheel and turning the cranks backward for bringing the latter into a favorable position preparatory to mounting the machine the backing-clutch $o$

*o' p* allows the brake-shoe K to turn backward with the wheel-hub. If the sprocket-wheel G should be clutched to the wheel-hub and the brake-shoe should be off or released from the hub at the time of backing the machine out of a rack the sprocket-wheel will turn backward with the hub, thereby wedging the brake-shoe into the friction-sleeve J by the action of the main cam-ring H. The brake-shoe now turns backward with the hub, and the inner clutch-collar *o'*, owing to its frictional contact with the brake-shoe, turns backward with the latter, causing the cams of this collar to ride down the cams of the outer clutch-collar *o* until the abrupt shoulders $o^7$ of the inner clutch-collar strike those of the outer collar, as shown in Fig. 2, and arrest the inner collar. By this action the brake-shoe is released from said inner collar and permitted to continue its backward movement without restraint. If the brake has been applied just after putting the machine in a rack and the machine is then backed out of the rack, the brake-shoe turns rearwardly with the hub and is released from the inner clutch-collar *o'* in the manner above described. This frictional backing-clutch, while effective and reliable, is practically noiseless in action.

The parts or abutments J and *i* of the wheel-hub, against which the laterally-movable brake-cone and the clutch-ring I bear, exert no pressure against the left-hand ball-bearing and the extreme right-hand bearing of the hub, which are the driving-bearings, and these bearings are therefore wholly relieved from end thrust both in driving the machine and in applying the brake. As the auxiliary cam-ring *l* is withdrawn from the brake-cone in driving the machine and the clutch-ring I is withdrawn from the clutch-face of the wheel-hub in coasting by the action of the oblique shoulders $h^5$, $h^6$, $i^2$, and $l^2$, there is no resistance to the forward rotation of the wheel-hub under either of these conditions.

I do not wish to claim, broadly, in this application the feature of the backing-clutch interposed between the brake-shoe and its stationary support, as the same is claimed in another application filed by me on the 9th day of July, 1900, Serial No. 23,000.

I claim as my invention—

1. In a back-pedaling brake, the combination with a wheel-hub having a brake-surface, and an internal clutch-flange, of a sleeve arranged in the end portion of the hub and rotatable independently thereof, a driving-wheel carried by said sleeve, a cam-ring mounted on said sleeve to turn therewith, and provided with a lateral cam which rises in a rearward direction, means interposed between said cam-ring and said clutch-flange which transmits the lateral thrust of the cam-ring to said flange, a laterally-movable clutch-ring interposed between said clutch-flange and said cam-ring and provided with a lateral cam which bears against the cam of the cam-ring, a brake-shoe, and means for operating the brake-shoe from said cam-ring, substantially as set forth.

2. In a back-pedaling brake, the combination with a wheel-hub having an internal brake-surface, and an internal clutch-flange, of a sleeve arranged in the end portion of the hub and rotatable independently thereof, a driving-wheel carried by said sleeve, a main cam-ring mounted on said sleeve to turn therewith and provided with oppositely-acting clutch and brake cams, means interposed between said cam-ring and said clutch-flange which transmits the lateral thrust of the cam-ring to said flange, a laterally-movable clutch-ring interposed between said main cam-ring and said clutch-flange and having cams which coöperate with the clutch-cams of said main ring, a laterally-movable brake-shoe arranged in the hub, and an auxiliary laterally-movable cam-ring interposed between said main cam-ring and the brake-shoe and provided with cams which coöperate with the brake-cams of said main ring, substantially as set forth.

3. In a back-pedaling brake, the combination with a wheel-hub having a brake-surface, and a laterally-movable brake-shoe, of a driving-wheel, a driving-clutch which connects said wheel with the hub, a main rotary cam-ring connected with said driving-wheel to rotate therewith, an auxiliary laterally-movable cam-ring interposed between said brake-shoe and said main cam-ring, and frictional holding means for preventing said auxiliary cam-ring from turning backwardly with said main cam-ring, substantially as set forth.

4. In a back-pedaling brake, the combination with a wheel-hub having a brake-surface, and a laterally-movable brake-shoe, of a driving-wheel, a driving-clutch which connects said wheel with the hub, a main rotary cam-ring connected with said driving-wheel to rotate therewith, an auxiliary laterally-movable cam-ring interposed between said brake-shoe and said main cam-ring, and a spring interposed between said main and auxiliary cam-rings, and tending to press the auxiliary ring against the brake-shoe, substantially as set forth.

5. In a back-pedaling brake, the combination with a wheel-hub having a brake-surface and a clutch-face, of a brake-shoe, a driving-wheel rotatable independently of the wheel-hub, means for operating the brake-shoe from the driving-wheel, a cam-ring connected with the driving-wheel to turn therewith and having a lateral clutch-cam provided at its high rear end with an oblique or undercut shoulder, and a clutch-ring interposed between the clutch-face of the wheel-hub and said cam-ring and provided with a lateral cam which coöperates with the clutch-cam of said ring, and at the high rear end of its cam with an oblique or undercut shoulder which coöperates with the shoulder of said cam-ring, substantially as set forth.

6. In a back-pedaling brake, the combination with a wheel-hub having a brake-surface, and a laterally-movable brake-shoe, of a driving-wheel, a driving-clutch which connects said wheel with the hub, a main rotary cam-ring connected with said driving-wheel to rotate therewith, and having a lateral brake-cam provided at its high rear end with an oblique or undercut shoulder, and an auxiliary cam-ring interposed between said main cam-ring and said brake-shoe and having a lateral cam which bears against the cam of said main cam-ring and which is provided at its high end with an oblique or undercut shoulder coöperating with the shoulder of said main cam-ring, substantially as set forth.

7. In a back-pedaling brake, the combination with a wheel-hub having a brake-surface, and a laterally-movable brake-shoe, of a support for the brake-shoe having a stop or flange against which the brake-shoe abuts, a non-rotary clutch-collar held against lateral movement on said support and provided with a cam, and a rotary clutch-collar bearing against the brake-shoe and provided with a cam which bears against the cam of said non-rotary clutch-collar and which is arranged to force the brake-shoe against the stop of said support when the rotary clutch-collar is turned forwardly, substantially as set forth.

8. In a back-pedaling brake, the combination with an axle having a stop or shoulder, a wheel-hub having a brake-surface, and a loose driving-wheel, and a driving-clutch connecting the hub with said wheel, of a laterally-movable sleeve arranged on the axle and having a flange or stop, a laterally-movable brake-shoe adapted to abut at its inner or rear end against the shoulder of the axle and having a stop or shoulder which bears against the flange of said sleeve, means for operating the brake-shoe from the driving-wheel, a non-rotary clutch-collar mounted on said sleeve and held against lateral movement thereon and provided with a lateral cam, a rotary clutch-collar bearing against the brake-shoe and provided with a cam which coöperates with the cam of said non-rotary clutch-collar, and a spring which tends to force said rotary clutch-collar against the brake-sleeve and the latter against said axle-shoulder, substantially as set forth.

9. In a back-pedaling brake, the combination with an axle having a stop or shoulder, a wheel-hub having a brake-surface, and a loose driving-wheel, and a driving-clutch connecting the hub with said wheel, of a laterally-movable sleeve arranged on the axle and having a flange or stop, a laterally-movable brake-shoe adapted to abut at its inner or rear end against the shoulder of the axle and having an internal conical face and a stop or shoulder which bears against the flange of said collar, means for operating the brake-shoe from the driving-wheel, a non-rotary clutch-collar mounted on said sleeve and held against lateral movement thereon and provided with a lateral cam, and a rotary clutch-collar having a conical face which bears against the corresponding face of the brake-shoe and a cam which bears against the cam of the non-rotary clutch-collar, substantially as set forth.

10. In a back-pedaling brake, the combination with a wheel-hub having a brake-surface, and a loose driving-wheel, and a driving-clutch connecting the hub with said wheel, of a laterally-movable brake-shoe, means for operating said shoe from the driving-wheel, a supporting-sleeve arranged in the brake-shoe and provided with a stop or flange against which the brake-shoe abuts, a non-rotary clutch-collar engaging with said sleeve by a screw-thread and provided with a lateral cam, and a rotary clutch-collar bearing against the brake-shoe and having a cam which bears against the cam of the non-rotary clutch-collar, substantially as set forth.

11. The combination with an axle having a stop or shoulder, a wheel-hub having a brake-surface, and a loose driving-wheel, and a driving-clutch connecting the hub with said wheel, of a laterally-movable sleeve arranged on the axle and having a flange or stop, a hollow brake-shoe provided at its rear or inner end with a head which bears against said axle-shoulder and with an internal shoulder which bears against the flange of said sleeve, said sleeve-flange being arranged to clear the head of the shoe, means for operating the brake-shoe from said driving-wheel, a non-rotary clutch-collar held against lateral movement on said sleeve and having a lateral cam, a rotary clutch-collar bearing against the brake-shoe and having a cam which bears against the cam of said non-rotary clutch-collar, and a spring which tends to force said rotary clutch-collar against the brake-shoe and the head of the shoe against said axle-shoulder, substantially as set forth.

12. In a back-pedaling brake, the combination with a wheel-hub having a brake-surface and a clutch face or flange, of a brake-shoe, a rotary sleeve arranged in the hub and carrying a driving-wheel, a laterally-movable clutch-ring arranged to bear against the clutch-flange of the hub, a rotary cam-ring connected with said rotary sleeve, held against lateral movement thereon and arranged between said clutch-ring and the brake-shoe, rolling antifriction members interposed between said cam-ring and the clutch-flange of the hub, and means for operating the brake-shoe from said cam-ring, substantially as set forth.

13. In a back-pedaling brake, the combination with a wheel-hub having a brake-surface and a brake-shoe coöperating therewith, of a fixed arm or bracket connected with the brake-shoe and provided with a longitudinal slot which extends to the front end of the arm, and at its front end with an inwardly-projecting stop-lip, substantially as set forth.

14. In a back-pedaling brake, the combination with a velocipede-fork, a wheel-hub having a brake-surface and a brake-shoe coöperating therewith, of an arm or bracket connected with the brake-shoe and provided with a longitudinal slot which extends to the front end of the arm, and having its front end bent inwardly to form a stop-lip, and a clip secured to the velocipede-fork and having an inwardly-extending bolt which passes through the slot of said arm, substantially as set forth.

Witness my hand this 17th day of October, 1900.

CHARLES O. BARNES.

Witnesses:
CARL F. GEYER,
CLAUDIA M. BENTLEY.